United States Patent [19]

Campbell et al.

[11] Patent Number: 4,523,002

[45] Date of Patent: Jun. 11, 1985

[54] IONICALLY CROSS-LINKED SILOXANE POLYMERS

[75] Inventors: John R. Campbell, Clifton Park; Robert E. Williams, Jr., Scotia, both of N.Y.

[73] Assignee: General Electric Company, Schenectady, N.Y.

[21] Appl. No.: 568,166

[22] Filed: Jan. 4, 1984

[51] Int. Cl.$^3$ .............................................. C08G 77/04
[52] U.S. Cl. .................................... 528/26; 528/27; 528/33; 528/34; 528/38; 528/901; 525/474
[58] Field of Search ................. 525/474; 528/38, 901, 528/33, 26, 34, 27

[56] References Cited

PUBLICATIONS

Litt & Matsuda, J. Polymer Science, vol. 19, p. 1221 (1975).
Graiver et al., J. Polymer Science, Polymer Chem. Ed., vol. 17, pp. 3559–3572; 3573–3636 (1979).

*Primary Examiner*—Melvyn I. Marquis
*Attorney, Agent, or Firm*—Richard J. Traverso; James C. Davis, Jr.; James Magee, Jr.

[57] ABSTRACT

Zwitterionic siloxane polymers containing tertiary silicone atoms with zwitterions and their aminoalkyl siloxane polymer intermediates production are provided. Methods of their production are also provided. The aminoalkyl siloxane polymer intermediates and the zwitterionic siloxane polymers are obtained by co-polymerizing trifunctional aminoalkyl silanes or zwitterionic silanes, respectively, with hydroxy-terminated siloxane oligomers in the presence of an acid catalyst. The aminoalkyl siloxane polymer intermediates are converted to zwitterionic siloxane polymer by reaction with an organosultone or an organolactone. Trifunctional aminoalkyl silanes are readily available and utilizing these silanes provides an economical route to obtaining zwitterionic siloxane polymers.

7 Claims, No Drawings

IONICALLY CROSS-LINKED SILOXANE POLYMERS

CROSS REFERENCE TO RELATED APPLICATIONS

This invention is related to subject matter disclosed in copending applications Ser. Nos. 568,018, now U.S. Pat. No. 4,496,705, 568,165 and 568,019, now U.S. Pat. No. 4,493,926. All of the aforesaid applications are assigned to the same assignee as the present invention and all disclosures referenced above are incorporated herein by reference.

BACKGROUND OF THE INVENTION

This invention relates to ionically cross-linked siloxane polymers. More particularly, this invention relates to ionically cross-linked zwitterionic siloxane polymers having ionic cross-links at trifunctional silicone atoms and a method of their production.

Zwitterions are ions which are both positively and negatively charged. Common zwitterionic species are the amino sulfonates, $NH_2^+-R-SO_3^-$ and the amino carbonates, $NH_2^+-R-COO^-$; wherein R is a divalent hydrocarbon radical more particularly defined below. Zwitterionic species are typically obtained from ionizing amino acids and the like; however, siloxane polymers containing zwitterions have been prepared by Litt and Matsuda, *J. Polymer Science*, Vol. 19, p. 1221 (1975) and by Graiver et al., *J. Poly. Sci.*, Polymer Chem. Ed., Vol. 17, p. 3559 (1975). The contents of these articles are incorporated herein by reference.

Litt and Matsuda disclose a process for producing zwitterionic silanes by reacting the trifunctional aminoalkyl silanes, γ-aminopropyltriethoxysilane and N-aminoethyl-γ-amino-propyltrimethoxy silane, with γ-propane sultone.

Graiver et al. disclose that siloxane polymers containing zwitterions can be obtained by treating an aminoalkyl siloxane with γ-propane sultone. The aminoalkyl siloxanes are provided by copolymerizing a dimethoxy silane having an aminoalkyl radical with a low molecular weight hydroxy-terminated polydimethylsiloxane and decamethyltetrasiloxane.

The zwitterions on the siloxane polymers provide ionic cross-linking between the siloxane polymers due to the coulombic forces exerted by the ions. An example of an ionic cross-link which may exist between two siloxane polymer segments is illustrated in the following formula:

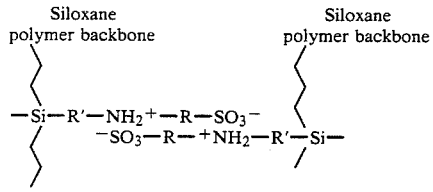

wherein R' is a divalent hydrocarbon radical of from 1 to 20 carbon atoms and R is a divalent hydrocarbon radical of from 2 to 20 carbon atoms.

These cross-links reduce the mobility of the polymer segments and increases their stiffness. For example, polydimethylsiloxanes (DP=500) are typically liquid at room temperature, yet corresponding zwitterionic polysiloxanes are solid rubbers at this temperature. Introducing zwitterions to as few as 0.5% of the silicone atoms within a siloxane fluid will provide a solid elastomeric material.

These elastomeric materials exhibit high adhesion to glass and other substrates such as, for example, wood, metal, polycarbonates, polystyrene, polyphenylene oxides and blends thereof, etc. The elastomeric properties and adhesive properties of these zwitterionic siloxanes make them suitable for use as adhesives, elastomeric adhesives, sealants, coatings, injection moldable and compression moldable rubbers and plastics, and various silicone based rubbers.

In the present state of the art, only difunctional silanes are utilized to obtain zwitterionic siloxane polymers having a degree of polymerization sufficiently high to provide the useful elastomeric materials described above. Difunctional zwitterionic siloxanes are either copolymerized with dimethyl siloxane oligomers or difunctional aminoalkyl silanes are copolymerized with dimethyl siloxane oligomers and subsequently reacted with γ-propanesultone to obtain the zwitterionic species on the siloxane polymers. It is difficult to prepare the difunctional zwitterionic silanes and the difunctional aminoalkyl silanes, which makes the production of zwitterionic siloxane polymers expensive. It is desirable to utilize less costly precursors in the production of zwitterionic siloxane polymers.

Trifunctional aminoalkyl silanes are more readily available and less expensive than their difunctional counterparts. However, copolymerization of such trifunctional aminoalkyl silanes with dimethyl siloxane by conventional methods has been difficult, if not impossible, to achieve. Typically the trifunctional aminoalkyl silane polymerizes with itself to form a yellow precipitate and does not become incorporated within the siloxane polymer. The present invention is based on the discovery of an effective method for copolymerizing the less expensive trifunctional aminoalkyl silanes or trifunctional zwitterionic silanes with siloxane oligomers to provide aminoalkyl siloxane polymer intermediates and zwitterionic siloxane polymers, respectively. Only a small quantity of the trifunctional aminoalkyl silanes and trifunctional zwitterionic silanes homopolymerize in this process, which permits a greater proportion to be incorporated within the copolymer produced.

SUMMARY OF THE INVENTION

This invention provides zwitterionic siloxane polymers having at least about 0.5% of the silicon atoms chemically combined in accordance with the formula $$R^x-Si(\theta)_3$$

and aminoalkyl siloxane polymer intermediates having at least 0.5% of the silicon atoms chemically combined in accordance with the formula $$R^a-(Si(\theta)_3)$$

wherein $R^a$ is an aminoalkyl radical, $R^x$ is a radical selected from the group consisting of aminoalkyl sulfonates and aminoalkyl carbonates and $\theta$ is a siloxane segment selected from the group consisting of siloxane radicals or a link to the siloxane polymer chain.

Methods for producing these zwitterionic siloxane polymers and aminoalkyl siloxane polymer intermediates are also provided, wherein trifunctional silanes having aminoalkyl radicals, or zwitterions are copolymerized with a hydroxy-terminated siloxane oligomer in the presence of a catalytic quantity of acid and solvent.

OBJECTS OF THE INVENTION

An object of the present invention is to provide aminoalkyl siloxane polymer intermediates and zwitterionic siloxane polymers by utilizing trifunctional silanes.

Another object of the present invention is to provide a method of incorporating a significant quantity of trifunctional aminoalkyl silane or trifunctional zwitterionic silane into a siloxane polymer.

Another object of the present invention is to provide zwitterionic siloxane rubbers which obtain their ridigity from both covalent and ionic cross-links.

DESCRIPTION OF THE PREFERRED EMBODIMENTS

The zwitterionic siloxane polymers and aminoalkyl siloxane polymer intermediates provided by this invention have a siloxane polymer backbone. These siloxane polymers typically have repeating units of a general formula selected from the group consisting of $$-(R''_2SiO)_m- \text{ and } -(R''SiO_{3/2})_m-$$

wherein R'' is a monovalent radical selected from the group consisting of hydrogen, alkyl radicals from 1 to 10 carbon atoms and aryl radicals 1 to 20 carbon atoms, including alkylaryl radicals, and m is an integer from 1 to about 2000. The zwitterions or aminoalkyl radicals replace the monovalent radical R'' on the silicone atoms. Examples of the siloxane polymer backbones where the zwitterions and aminoalkyl radicals are absent include, polydimethylsiloxane, polydimethyl-co-diphenylsiloxane, poly(methyl phenyl siloxane), etc. At least about 0.5% of the silicon atoms have the monovalent radical R'' replaced with a zwitterion in the zwitterionic siloxane polymers of this invention. These silicone atoms are chemically combined in accordance with the formula $$R^x-Si(\theta)_3 \qquad I$$

wherein $R^x$ is a zwitterion and $\theta$ is either a siloxane radical or a link to the siloxane polymer chain. Additional zwitterions may be bound to silicone atoms having a different chemical structure than that of formula I.

In the aminoalkyl siloxane polymer intermediates produced by this invention, at least about 0.5% of the silicon atoms have the monovalent radical R'' replaced with an aminoalkyl radical. These silicon atoms are chemically combined in accordance with the formula $$R^a-Si(\theta)_3 \qquad II$$

wherein $R^a$ is an aminoalkyl radical and $\theta$ is as defined above. The zwitterions, $R^x$, that may appear on the silicone atoms of formula I, are aminoalkyl sulfonates and aminoalkyl carboxylates. Suitable aminoalkyl sulfonates and aminoalkyl carboxylates are those of the formulas $$-R'-NH_2{}^+-R-SO_3{}^-$$

and $$-R'-NH_2{}^+-R-COO,$$

respectively, wherein R' is a divalent hydrocarbon radical of from 1–20 carbon atoms and R is a divalent hydrocarbon radical of from 2–20 carbon atoms. These divalent hydrocarbon radicals include alkyl radicals, aromatic radicals, alkylaryl radicals, and substituted derivatives thereof. The preferred zwitterions are the aminoalkyl sulfonate radicals of the formula $$-(R^1-NH^+)_n-R^2-NH_2{}^+ \qquad III$$
$$\phantom{-(R^1-NH^+)_n-}\underset{SO_3^-}{\overset{R^3}{|}} \phantom{-} \underset{SO_3^-}{\overset{R^3}{|}}$$

wherein $R^1$ and $R^2$ are selected from a group consisting of divalent alkylene radicals of from 1–10 carbon atoms and divalent aromatic radicals of from 6–20 carbon atoms, including alkylaryl radicals; $R^3$ is selected from a group consisting of divalent alkylene radicals of from 3 to 4 carbon atoms and divalent aromatic radicals of from 6–20 carbon atoms, including alkylaryl radicals; and n is an integer in the range of 0 to 5.

The preferred aminoalkyl radicals that appear on the aminoalkyl siloxane intermediates are of the formula $$-(R^1-NH)_n-R^2-NH_2 \qquad IV$$

wherein $R^1$, $R^2$ and n are as previously defined.

The silicon atoms of formula I and II are of a tertiary structure, i.e., the silicon atom is bonded to three siloxane segments. These siloxane segments, $\theta$, are either siloxane radicals or a link to the siloxane polymer chain. The siloxane radicals are distinguished from the siloxane polymer chain only by their length, the siloxane radicals being the shortest siloxane segment bonded to the tertiary silicon atom. Where the two shortest segments are of equal length, all of the siloxane segments are considered a part of the siloxane polymer chain. Both the siloxane radicals and the siloxane polymer chains are of the formula $$R'''-(R''_2SiO)_m-, \qquad V$$

wherein R'' is a monovalent radical selected from the group consisting of alkyl radicals of from 1 to 10 carbon atoms and aryl radicals of from 6 to 20 carbon atoms, including alkyl aryl radicals; m is an integer of from 1 to about 2,000 and R''' is selected from a group consisting of alkyl radicals of from 1 to 10 carbon atoms, the hydroxy radical, tertiary silicon atoms of the formulas $$\underset{\theta}{\overset{\theta}{|}}\phantom{-}R^x-\underset{|}{Si}-O- \quad \text{and,} \quad \underset{\theta}{\overset{\theta}{|}}\phantom{-}R^a-\underset{|}{Si}-O-,$$

and secondary silicon atoms of the formulas $$\underset{R''}{\overset{\theta}{|}}\phantom{-}R^x-\underset{|}{Si}-O-, \quad \text{and} \quad \underset{\theta}{\overset{\theta}{|}}\phantom{-}R^a-\underset{|}{Si}-O$$

wherein $R^x$, $R^a$, $\theta$ and R'' are as defined above.

The preferred zwitterionic siloxane polymers provided by this invention are those wherein the zwitterion, $R^x$, is of the formula

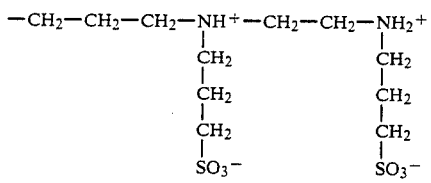

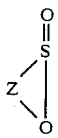

and the siloxane radicals and the siloxane polymer chain are of the formula

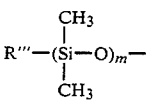
VI wherein R''' is limited to the methyl radical and the tertiary silicon atoms of the formula defined above having only the zwitterionic radical, $R^x$, and m is an integer having an average value between 30 and 200. The actual values for m may range from about 1 to about 2000 in the preferred zwitterionic siloxane polymers.

The preferred aminoalkyl siloxane polymer intermediates are those wherein $R^a$ is of the formula

—$CH_2$—$CH_2$—$CH_2$—NH—$CH_2$—$CH_2$—$NH_2$ and the siloxane radicals and the siloxane polymer chain are of the structure shown in formula VI with R''' being limited to the methyl radical and the tertiary silicon atoms of the formula defined above having only the aminoalkyl radical, $R^a$, and m is an integer having an average value between 30 and 200.

It is preferable to maintain the number of zwitterions and aminoalkyl radicals bound to the silicon atoms of the siloxane polymer backbones below about 10%. Where the number exceeds this proportion, the zwitterionic siloxane polymers produced become highly cross-linked and excessively rigid. However, siloxane polymers having more than 10% of their silicon atoms chemically bonded to zwitterions or aminoalkyl radicals are within the scope of this invention, providing the siloxane polymer has at least about 0.5% of the silicon atoms of formulas I or II. The additional zwitterions or aminoalkyl radicals may be bonded either to tertiary silicon atoms or secondary silicon atoms of the formulas within the scope of R''' defined above.

The zwitterionic siloxane polymers of this invention typically exhibit a degree of polymerization up to about 2000 with a molecular weight approaching 150,000. The average degree of polymerization is approximately 1500 with an average molecular weight of about 105,000. The zwitterionic siloxane polymers of this invention may be produced by two different processes. The first process co-polymerizes trifunctional zwitterionic silanes with hydroxy-endcapped siloxane oligomers. The second process utilizes the aminoalkyl siloxane polymer intermediates of this invention which are obtained by co-polymerizing a trifunctional aminoalkyl silane with a hydroxy-endcapped siloxane oligomer. The aminoalkyl siloxane polymer intermediate is then treated with an organosultone of the formula

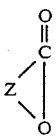
VII or an organolactone of the formula

VIII wherein Z is a divalent hydrocarbon species selected from the group consisting of alkalene radicals of from 3 to 4 carbon atoms and aryl radicals of from 6 to 20 carbon atoms, including arylalkyl radicals. Treatment of the aminoalkyl siloxane precursor with the organosultone or organolactone provides the zwitterionic species.

The same group of hydroxy endcapped siloxane oligomers may be utilized in both syntheses. These hydroxy-endcapped siloxane oligomers are typically of the formula

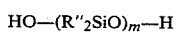

wherein each R'' is as defined above and m is an integer of from 1 to about 2000. Suitable hydroxy-endcapped siloxane oligomers also include branched chained siloxane oligomers that contain tertiary silicon atoms. Other suitable siloxane oligomers are those which already contain zwitterionic or aminoalkyl radicals. These oligomers may be obtained from a process known to the art or by the process provided by this invention. The preferred hydroxy-endcapped siloxane oligomers are the dimethyl siloxanes having a degree of polymerization of from 3 to about 800. Other suitable siloxane oligomers include polydimethyldiphenyl siloxanes and poly(methyl phenyl) siloxanes.

In the second process, where the zwitterionic siloxane polymers are obtained by first producing the aminoalkyl siloxane polymer intermediates, a trifunctional aminoalkyl silane is copolymerized with the hydroxy terminated siloxane oligomer to obtain the intermediate. Suitable trifunctional aminalkyl silanes are those of the formula

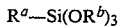

wherein each $R^b$ is independently selected from the group consisting of alkyl radicals of from 1 to 20 carbon atoms and aryl radicals of from 6 to 20 carbon atoms and $R^a$ is as defined above. The preferred trifunctional aminoalkyl silanes are those wherein each $R^b$ is a methyl radical. The most preferred trifunctional aminoalkyl silanes include N-aminoethyl-γ-aminopropyl trimethoxysilane and N-aminopropyl trimethoxysilane. Other suitable trifunctional aminoalkyl silanes include
N-aminoethyl-γ-aminopropyl triethoxysilane,
N-aminoethyl-γ-aminobutyl-trimethoxysilane,
2-aminoethyl-trimethoxysilane,
2-aminoethyl-triethoxysilane, 3-aminopropyl-triethoxysilane,
3-aminopropyl-tributoxysilane, etc.

The trifunctional zwitterionic silanes utilized in the first process for producing the zwitterionic siloxane polymers of this invention are derived from the trifunctional aminoalkyl silanes described above. These trifunctional zwitterionic silanes can be described by the formula

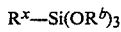

$$R^x-Si(OR^b)_3 \qquad V$$

wherein $R^x$ and $R^b$ are as defined above. As with the trifunctional aminoalkyl silanes, the preferred trifunctional zwitterionic silanes are those wherein each $R^b$ is a methyl radical. The most preferred trifunctional zwitterionic silanes include N-(3-propane-sulfonate)-γ-aminopropyl-trimethoxysilane and N-(3-propane sulfonate)aminoethyl)(3-propane-sulfonate)-γ-aminopropyl trimethoxy silane.

It may be desirable to hydrolyze a portion of the alkoxy or aryloxy groups on the silanes prior to copolymerization in accordance with the process described in copending application Ser. No. 568,018 now U.S. Pat. No. 4,496,705. Hydrolysis of all the functional groups produces a highly reactive species which encourages polymerization within itself and may not be desirable. However, hydrolysis of only a portion of the functional groups will not inhibit the copolymerization with the siloxane oligomers completely and permits the production of zwitterionic siloxane polymers of a high molecular weight.

To produce the zwitterionic siloxane polymers of this invention the ratio of trifunctional silane to siloxane oligomer must be sufficiently large to incorporate zwitterions on at least 0.5 percent of the silicone atoms within the polymers produced. Therefore, the actual ratios are dependent on the size of the siloxane oligomer or oligomers that are utilized. The process described herein is also capable of producing zwitterionic siloxane polymers and aminoalkyl siloxane polymer intermediates, having less than 0.05 percent of the silicone atoms of formula I and II, respectively.

The same steps and procedures are utilized when copolymerizing the siloxane oligomers with the trifunctional zwitterionic silanes and the trifunctional aminoalkyl silanes. Copolymerization is accomplished by reacting a mixture of the startingf materials in the presence of an acid catalyst at a temperature within the range of about 25° C. to about 100° C. It is preferrable to let the reaction continue for about 0.5 to 5 hours.

The rate of reaction is dependent on temperature. The magnitude of the reaction temperature is limited by the degradation of the starting materials. The most preferred reaction temperature falls in the range of about 40° C. to about 90° C. Copolymerization takes place almost immediately upon addition of the acid catalyst. The reaction approaches completeness within the preferred time range. It may be desirable to place the reaction mixture under a nitrogen atmosphere to prevent oxidation of the silanes. Alternatively, the reaction can be run under vacuum or another inert atmosphere.

Suitable acid catalysts include the carboxylic acids such as, acetic acid, formic acid, trifloroacetic acid, steric acid, trichloroacetic acid, benzoic acid, phenylacetic acid, 2-chlorobutanoic acid, 3-chlorobutanoic acid, dicloroacetic acid, 4-chlorobutanoic acid, 5-chlorobutanoic acid, etc. Other acids such as hydrogen chloride, hydrogen bromide, hydrogen iodide, hydrogen fluoride, perchloric, chloric, chlorous, hypochlorous, p-toluene sulfonic, bromic, carbonic, phosphoric, hypophosphorous, phosphorous, etc. are also suitable.

Quantities of acid sufficient to catalyze the reaction typically fall within the range of about 0.1 to 2 weight percent. However, smaller quantities can be expected to provide catalysis of this reaction and are deemed to be equivalent to those within the range defined above. Larger quantities will also provide catalysis, but do not provide any improvement in results.

Silanes other than trifunctional silanes, such as the difunctional silanes, may be present in the reaction medium. Introducing difunctional zwitterionic or aminoalkyl silanes may be desired to increase the number of ionic cross-links without increasing the branched chains of the zwitterionic siloxane polymers produced. Although these difunctional silanes compete for the siloxane oligomers, they do not exclude the trifunctional zwitterionic silanes or aminoalkyl silanes.

Upon copolymerization of the starting materials, a chain stopper may be introduced into the reaction medium to remove the hydroxy-endcaps. Any siloxane oligomer having trialkyl substituted silicone atoms as end groups may be utilized as a chain stopper. Examples of such chain stoppers include, hexamethyl disiloxane, octamethyl trisiloxane, decamethyl tetrasiloxane, hexamethyl disilizane, etc. The quantity of chain stopper preferrably provides a molar ratio of siloxane oligomer to chain stopper of about 1000 to 1. Suitable molar ratios provide values for the range of about 100 to 1500. However, the use of a chain stopper is unnecessary to produce either the aminoalkyl siloxane polymers or the zwitterionic siloxane polymers and may not be desired.

When copolymerization provides the aminoalkyl siloxane polymer intermediate to obtain a zwitterionic siloxane polymer, it is necessary to convert the aminoalkyl radicals to the corresponding zwitterion. Typically an organic solvent is added to solublize the aminoalkyl siloxane polymers. Suitable solvents include, toluene, benzene, tetrahydrofuran, etc. The reaction mixture is then dired to remove a substantial portion of water along with any alcohol produced by the polymerization reaction and allowed to cool to room temperature. An organo-sultone or organo-lactone is added to the reaction mixture while under a nitrogen atmosphere. Zwitterionic species begin to form immediately. After a period of about 10 to 20 hours, substantially all the aminoalkyl radicals are converted to zwitterions. The organic solvent is then removed from the reaction mixture to allow the ionic cross-links to form and obtain the zwitterionic siloxane rubber. Suitable organosultones and organolactones utilized to produce the zwitterionic species are those of formulas VII and VIII. The preferred organosultone is γ-propane sultone and the preferred organolactone is γ-propiolactone. The preferred quantity of the organosultone or organolactone utilized is about 1 molar equivalent to the number of amino groups which appear on the aminoalkylsiloxane polymer intermediate.

The following examples are provided to illustrate the process comprising this invention. These examples are not provided with the intent to limit the scope of this invention to their contents.

EXAMPLE 1

To a 250 milliliter round bottom flask with mechanical stirrer were added N-(2-aminoethyl)-3-amino-propyl-trimethoxysilane (1.50 grams, 6.76 millimoles) and a hydroxy-terminated polydimethyl siloxane fluid (50 grams; MW about 15,000; DP about 200) under a nitrogen atmosphere. Acetic acid (10 drops) was added and the contents of the flask were heated to 55° C. with an external oil bath. After 1.5 hours the flask contained a milky white oil of a much higher viscosity than the starting mixture. Hexamethyldisilizane (1.5 grams) was added and stirring continued at 55° C. for an additional 0.5 hours. Toluene (450 grams) was added, the flask was equipped with a distillation head and the oil bath temperature was raised to 130° C. Approximately 150 grams of distillate was collected, the toluene served to remove any water or methanol produced by the siloxane condensation reactions. The remaining toluene solution was allowed to cool to 23° C. and γ-propane sultone (3.0 grams, 13.5 millimoles) was added in one portion as a solution in 60 grams of dry toluene. The solution was stirred at 23° C. for 16 hours. Removal of the toluene by heating in vacuo (110° C., 0.05 millimeters, 1.5 hours) produced a white, translucent, elastomeric, siloxane rubber.

EXAMPLE 2

This example demonstrates a co-polymerization process that is known to the art. To a 250 ml round bottom flask with mechanical stirrer were added γ-aminoethylaminopropyltrimethoxysilane (6 parts), octamethyltetrasiloxane (100 parts) and decamethyl-tetrasiloxane (0.84 part). A powdered potassium hydroxide catalyst (0.4 parts) was utilized instead of an acid catalyst as utilized in Example 1. The mixture was stirred and heated to 160° under a nitrogen atmosphere. At about 140° C. the mixture increased in viscosity and a copious amount of white precipitate was observed. After 18 hours at 160° C., the mixture was cooled to ambient temperature, diluted with toluene (150 parts), stirred for 1 hour, and the solids removed by a vacuum filtration. A yellow oil was obtained by concentrating the solution on a rotary evaporator and further drying under vacuum (0.1 torr, 75° C., 2 hours). Analysis of the oil by infrared spectroscopy indicated a low level of nitrogen incorporation in the polymer (N—H stretch at 340 centimeters$^{-1}$). Infrared analysis of the solid indicated that most of the amine was within the precipitate.

Although the above examples have shown an embodiment of the present invention, further modifications are possible by those skilled in the art without departing from the scope and spirit of this invention.

What is claimed is:
1. A method of producing zwitterionic siloxane polymers comprising
   a. copolymerizing an aminoalkyl-trialkoxy-silane with a hydroxy-endcapped siloxane oligomer in the presence of a catalytic quantity of acid to provide an aminoalkyl-siloxane polymer intermediate; and
   b. reacting said aminoalkyl siloxane polymer intermediate with a member from the group consisting of organo-lactones and organo-sultones in the presence of a solvent.
2. A method as in claim 1 wherein the aminoalkyl siloxane polymer intermediate is reacted with γ-propane sultone.
3. A method of producing zwitterionic siloxane polymers comprising the steps of
   a. reacting N-(2-aminoethyl)-3-aminopropyl trimethoxysilane with a hydroxy-endcapped polydimethyl-siloxane fluid of the formula

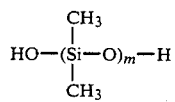

wherein m is an integer of from 3 to 800, in the presence of a catalytic quantity of acetic acid at a temperature in the range of about 20° to 100° C.; and
   b. reacting γ-propane sultone with the reaction product of step A in the presence of a solvent.
4. A method as in claim 3 wherein the concentration of acetic acid within the solvent medium falls within the range of 0.05 to 1.0 weight percent of the hydroxy endcapped polydimethylsiloxane fluid and the trifunctional silane combined.
5. A method of producing zwitterionic siloxane polymers comprising co-polymerizing a trifunctional zwitterionic silane of the formula

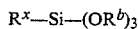

with a hydroxy-endcapped siloxane oligomer in the presence of a catalytic quantity of acid and a solvent
   wherein $R^x$ is a radical selected from the group consisting of aminoalkyl-sulfonates and aminoalkyl carboxylates and $R^b$ is a monovalent radical selected from the group consisting of alkyl radicals of from 1 to 20 carbon atoms and aryl radicals of from 6 to 20 carbon atoms.
6. A method as in claim 5 wherein the acid catalyst is selected from the group consisting of acetic acid, trifluoroacetic acid, formic acid, hydrofluoric acid, hydrochloric acid and phosphoric acid.
7. A method of producing zwitterionic siloxane polymers comprising copolymerizing
   N-(3-propane-sulfonate)-γ-aminopropyl-trimethoxy with a hydroxy-endcapped polydimethylsiloxane fluid of the formula

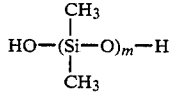

wherein m is an integer of from 3 to 800;
in the presence of a catalytic quantity of acetic acid and a solvent at a temperature in the range of about 20° C. to 100° C.

* * * * *